United States Patent [19]

Kakuishi et al.

[11] Patent Number: 4,780,365

[45] Date of Patent: Oct. 25, 1988

[54] MAGNETIC RECORDING MEDIUM

[75] Inventors: Yutaka Kakuishi; Kenichi Masuyama; Masaaki Fujiyama; Toshimitu Okutu, all of Odawara, Japan

[73] Assignee: Fuji Photo Film Co., Ltd., Kanagawa, Japan

[21] Appl. No.: 19,286

[22] Filed: Feb. 26, 1987

[30] Foreign Application Priority Data

Feb. 26, 1986 [JP] Japan .................................. 61-42745

[51] Int. Cl.$^4$ ............................................... G11B 5/70
[52] U.S. Cl. .................................... 428/323; 427/131; 428/329; 428/336; 428/694; 428/900
[58] Field of Search ............... 428/323, 329, 694, 900, 428/336; 427/131

[56] References Cited

U.S. PATENT DOCUMENTS 4,582,757 4/1986 Miyoshi et al. ...................... 427/131
4,618,535 10/1986 Nishimatsu et al. ................. 428/694
4,639,389 1/1987 Nishimatsu et al. ................. 427/131

Primary Examiner—Paul J. Thibodeau
Attorney, Agent, or Firm—Sughrue, Mion, Zinn, Macpeak, and Seas

[57] ABSTRACT

In a magnetic recording medium comprising a nonmagnetic support, a magnetic recording layer provided on one surface of said support and a back layer containing carbon black provided on another surface of said support, the improvement wherein said back layer has thickness of not larger than 0.6 μm and contains an inorganic filler powder having a Mohs' scale of hardness of not less than 5, a mean particle diameter of smaller than the thickness of the back layer and not smaller than 1/5 of the thickness thereof, and the maximum particle diameter of not larger than 11/10 of the thickness of the back layer.

8 Claims, No Drawings

MAGNETIC RECORDING MEDIUM

BACKGROUND OF THE INVENTION

1. Field of the Invention

The present invention relates to a magnetic recording medium, and more particularly, to a magnetic recording medium improved in the running endurance.

2. Description of Prior Arts

Recently, a demand for higher dense recording has increased in a magnetic recording medium (also referred to hereinafter as a magnetic tape) such as an audio tape, a video tape, or a recording medium employed in a computer system, and hence the size of a ferromagnetic powder conventionally employed in the magnetic tape such as $\gamma$-iron oxide or Co-containing $\gamma$-iron oxide is minimized. Further, a magnetic recording medium using a ferromagnetic metal powder composed of non-oxide type metal or alloy such as a metal audio tape and a metal video tape has been practically employed.

At present, as the magnetic recording medium such as an audio tape, a video tape, or a recording medium for a computer system, a magnetic tape having a structure comprising a nonmagnetic support, a magnetic recording layer provided on one surface of the support and a back layer provided on another surface of the support for enhancement in the running property of the tape is generally employed. In the magnetic recording medium having such structure, the surface of the magnetic recording layer is especially smoothened to enhance the sensitivity (particularly the output level in the high-frequency region). Further, the magnetic tape of recent days is prepared in the form of a thin film having whole thickness of not larger than approx. 20 $\mu$m, by making each thickness of the support, magnetic recording layer and back layer smaller.

The back layer of the magnetic recording medium such as a magnetic tape is in the form of a thin film generally comprising carbon black and an inorganic filler powder both dispersed in a binder, and contributes to the improvement of running property of the magnetic recording tape as described hereinbefore.

However, the present inventors have found that the drop-out phenomenon is prominently brought about in the running procedure of the magnetic tape and the surface of the recording layer is markedly damaged (or scratched) after the repeated running of the tape by making the thickness of the back layer smaller. As a result of further studies by the inventors, it has been confirmed that the above-mentioned increase of drop-out phenomenon and occurrence of damages (or scratches) on the surface of the magnetic recording layer after repeated running are caused by a great number of inorganic filler particles protruded on the surface of the back layer. In more detail, a magnetic tape such as an audio tape or a video tape is stored in such a condition that the tape is wound up around a hub, and the tape is automatically wound around a hub on another side after the running procedure is complete. In the winding stage and the storage in the wound state, the magnetic recording layer and the back layer are placed in close contact with each other under pressure. Hence, if a great number of inorganic filler particles are protruded on the surface of the back layer, the surface of the magnetic recording layer is damaged (or scratched) by the protruding tips of the filler particles, and thereby occurrence of drop-out phenomenon increases in the running procedure of the magnetic tape.

SUMMARY OF THE INVENTION

It is an object of the present invention to provide a magnetic recording medium having a thin back layer which is hardly damaged on the surface of the magnetic recording layer.

It is another object of the invention to provide a magnetic recording medium having a thin back layer which less generates drop-out phenomenon.

It is a further object of the invention to provide a magnetic recording medium having a thin back layer in which said back layer hardly deteriorates the S/N property of the magnetic recording layer.

There is provided by the present invention a magnetic recording medium comprising a nonmagnetic support, a magnetic recording layer provided on one surface of said support and a back layer containing carbon black provided on another surface of said support, which is characterized in that said back layer has a thickness of not larger than 0.6 $\mu$m and contains an inorganic filler powder having a Mohs' scale of hardness of not less than 5, a mean particle diameter of smaller than the thickness of the back layer and not smaller than 1/5 of the thickness thereof, and the maximum particle diameter of not larger than 11/10 of the thickness of the back layer.

In the present invention, most particles of the inorganic filler powder have a size of smaller than the thickness of the back layer and not smaller than 1/5 of the thickness thereof, and the maximum particle diameter of the inorganic filler powder is not larger than 11/10 of the thickness of the back layer. Employment of the inorganic filler powder having such particle size prevents excessive protrusion of the filler particles on the surface of the thin back layer, whereby the surface of the magnetic recording layer is hardly damaged in the winding stage of the tape or storing stage in the wound state of the tape, with keeping the function of the back layer, namely, enhancement of the running property. Accordingly, the magnetic recording medium of the invention less generates drop-out phenomenon, and is hardly deteriorated in the S/N property of the magnetic recording layer.

DETAILED DESCRIPTION OF THE INVENTION

A magnetic recording medium comprising a magnetic recording layer provided on one surface of the nonmagnetic support is already known, and materials of each layer of the known recording medium or shapes thereof can be also employed in the magnetic recording medium of the present invention. For instance, plastic is generally used as the nonmagnetic support material. The magnetic recording layer comprises a binder and a ferromagnetic powder disersed therein. Examples of the ferromagnetic powder include $\gamma$-iron oxide type ferromagnetic powder, Co-containing $\gamma$-iron oxide type ferromagnetic powder, ferromagnetic metal powder, barium ferrite and strontium ferrite. The magnetic recording layer may further contain other various additives.

The magnetic recording medium of the invention is characterized in the structure of the back layer, so that the structure thereof will be mainly described hereinafter.

The back layer of the present invention is in the form of a thin film comprising carbon black and an inorganic filler powder both dispersed in a binder.

That is, in the magnetic recording medium of the invention, the back layer has a thickness of not larger than 0.6 μm and contains carbon black and an inorganic filler powder having a Mohs' scale of hardness of not less than 5. The mean particle diameter of the inorganic filler powder is smaller than the thickness of the back layer and not smaller than 1/5 of the thickness thereof, and the maximum particle diameter of the inorganic filler powder is not larger than 11/10 of the thickness of the back layer.

The carbon black contained in the back layer of the recording medium according to the invention mainly serves as lubricant and antistatic agent.

In more detail, incorporation of carbon black into the back layer can reduce the surface resistance of the back layer. Hence, carbon black effectively reduces electric chargeability of the resulting magnetic tape, and thereby deposition of dust, etc. on the surface of the tape is prominently reduced, decreasing occurrence of the drop-out phenomenon. Further, in the case of coating a lubricant over the surface of the back layer, carbon black also functions to efficiently retain the lubricant in the back layer.

Carbon black employed in the invention preferably has a particle size in the range of 0.03 to 0.1 μm.

The inorganic filler powder to be contained in the back layer of the magnetic recording medium according to the invention is an inorganic powder comprising extremely small-sized solid particles having a Mohs' scale of not less than 5. Examples of the inorganic filler powder employable in the invention include powders of chromium(III) oxide (Mohs' scale of hardness: 9), α-alumina (hardness: 9), titaniumn dioxide (hardness: 6.5), silicon dioxide (hardness: 7), tin oxide (hardness: 6.5), and α-iron oxide (hardness: 6.5). These inorganic filler powders can be employed singly or in combination. Preferably employable in the invention are powders having a Mohs' scale of hardness of not less than 9, and therefore powders of α-alumina and chromium(III) oxide are particularly preferred.

As described hereinbefore, the inorganic filler powder to be incorporated into the back layer in the present invention is characterized in that the mean particle diameter is smaller than the thickness of the back layer and not smaller than 1/5 of the thickness thereof, and the maximum particle diameter is not larger than 11/10 of the thickness of the back layer. That is, the inorganic filler powder having the maximum particle diameter of not larger than 11/10 of the thickness of the back layer and the mean particle diameter of smaller than the thickness of the back layer and not smaller than 1/5 of the thickness thereof is employed in the invention in place of the conventional inorganic filler powder having a mean particle diameter of approx. 10 μm.

The mean particle diameter of the inorganic filler powder is preferably not larger than 4/5 and not smaller than ¼ of the thickness of the back layer.

Further, the maximum particle diameter of the inorganic filler powder is preferably not larger than the thickness of the back layer, more preferably not larger than 4/5 of the thickness thereof.

The binder employable for the back layer can be selected from known resins employed for the formation of a magnetic recording layer or a back layer of the conventional magnetic recording medium such as thermoplastic resins, thermosetting resins, reactive resins and mixtures thereof. As concrete examples, the binder can be selected from the following resins, and the binder used singly or in combination preferably has a glass transition point (Tg) of not lower than 40° C., more preferably not lower than 60° C.

Examples of the thermoplastic resins employable for the formation of the recording layer include vinyl chloride/vinyl acetate copolymer, vinyl chloride/vinylidene chloride copolymer, vinyl chloride/acrylonitrile copolymer, acrylic acid/ vinylidene chloride copolymer, acrylic acid/acrylonitrile coolymer, styrene/acrylic acid ester copolymer, methacrylic acid/acrylonitrile copolymer, methacrylic acid/vinylidene chloride copolymer, methacrylic acid/styrene copolymer, urethane elastomer, polyvinyl fluoride, vinylidene chloride/acrylonitrile copolymer, butadiene/acrylonitrile copolymer, polyamide resins, cellulose derivatives (e.g., cellulose acetate butyrate, cellulose diacetate, cellulose propionate and nitrocellulose), styrene/butadiene copolymer, polyester resins, chlorovinyl ether/acrylic acid ester copolymer, amino resins, and various rubber-type resins.

Examples of the thermosetting resins or reactive resins employable in the invention include phenol resin, epoxy resin, polyurethane hardening resin, urea resin, melamine resin, alkyd resin, acrylic reactive resin, polyisocyanate compound and polyamine.

The ratio of the solid particles (carbon black and inorganic filler powder) to the binder in the back layer is preferably in the range of 1/0.5 to 1/3.5 (solid particles/binder, by weight), more preferably in the range of 1/0.8 to 1/3.0.

When the ratio of the solid particles to the binder exceeds the upper limit of the above-defined ratio, the solid particles are liable to drop off from the back layer (so-called powder dropping phenomenon). When the ratio of the solid particles to the binder is less than the above-defined ratio, the friction coefficient of the back layer tends to increase, and in an excessive case the resulting layer does not function as a back layer.

The ratio of carbon black to the inorganic filler powder is preferably in the range of 1/0.3 to 1/0.01 (carbon black/inorganic filler powder, by weight), more preferably in the range of 1/0.1 to 1/0.03.

Methods of the formation of a back layer on the surface of the nonmagnetic support are already known, and the back layer of the invention can be basically formed on the surface of the support according to the known methods. For instance, the above-mentioned carbon black, inorganic filler powder, binder and other optional additives if desired are dissolved or dispersed in an organic solvent to prepare a coating solution. The coating solution is applied onto the surface of the support, and then the coated layer of the solution is dried to remove the solvent. Thus, a back layer can be formed on the surface of the support.

The formation of the back layer on the support can be made before or after the formation of the magnetic recording layer. Otherwise, both of the back layer and the recording layer can be formed simultaneously.

The surface of the back layer of the recording medium according to the invention may be coated with a lubricant. As a method of coating a lubricant over the thin film of back layer, there can be mentioned a method of coating an organic solution containing a lubricant over the thin film and drying a layer of the coated solution. This coating can be carried out by a conventional method such as a method of using a roller, a spray, a doctor blade, etc. Alternatively, there can be also employed a method of coating the organic solution of the lubricant over the surface of the magnetic recording layer and then superposing the aforementioned back layer on the magnetic recording layer via the coated organic solution so as to transfer the organic solution of the lubricant onto the surface of the back layer.

Examples of the lubricant employable in the invention include organic compounds of fats and oils type such as higher fatty acid, metallic soap, higher fatty acid amide, higher fatty acid ester, a mineral oil, an animal (e.g., whale oil), and a vegetable oil; inorganic powders such as a powder of silicone oil, molybdenum disulfide and tungsten disulfide; powders of plastics such as polyethylene, polypropylene, polyethylene/vinyl chloride copolymer and tetrafluorpolyethylene; α-olefin polymeric products; unsaturated aliphatic hydrocarbon in the liquid form at room temperature (i.e, a compound in which nolefinic double bond is bonded to a terminal carbon atom, e.g., a compound having approx. 20 carbon atoms); fluorocarbons; and mixtures thereof. Among them, preferred is a compound mainly containing a higher fatty acid or a fatty acid ester. The higher fatty acid or fatty acid ester preferably has not less than 12 carbon atoms, more preferably 12–18 carbon atoms. Particularly preferably employed is an ester of such fatty acid and an alcohol having 1–12 carbon atoms.

The examples and the comparison examples of the present invention are given below. In the following examples, the expression "part(s)" means "part(s) by weight", unless otherwise specified.

EXAMPLE 1

The components indicated below were mixed dispersedly to give a magnetic paint for the formation of a magnetic recording layer.

Ferromagnetic alloy powder (Fe-Ni alloy, Ni content: 5 wt. %, specific surface area(S-BET): 55 m$^2$/g): 100 parts
Vinyl chloride/vinyl acetate/maleic anhydride copolymer (available from Nippon Zeon Co., Lit.): 12 parts
Polyurethane resin (N-2301, available from Japan Polyurethane Co., Ltd.): 12 parts
Polyisocyanate compound (Colonate L, available from Japan Polyurethan Co., Ltd.): 8 parts
Carbon black (mean particle size: 0.04 μm): 2 parts
Oleic acid: 1 part
Myristic acid: 1 part
Butyl stearate: 1 part
Methyl ethyl ketone: 300 parts.

Independently, the components indicated below were mixed dispersedly to give a coating solution for the formation of a back layer.

Carbon black (mean particle size: 0.05 μm): 35 parts
α-alumina (mean particle diameter: 0.15 μm, maximum particle diameter: 0.3 μm): 1.8 parts
Nitrocellulose: 20 parts
Polyurethane resin (N-2301, available from Japan Polyurethane Co., Ltd.): 10 parts
Polyisocyanate compound (Colonate L, available from Japan Polyurethane Co., Ltd.): 10 parts
Methyl ethyl ketone: 300 parts One surface of a polyethylene terephthalate film having thickness of 10 μm was coated with the above-prepared magnetic paint in such a manner that the resulting layer would have thickness of 3.0 μm in dry state. Another surface of the polyethylene terephthalate film was coated with the above-prepared coating solution for the formation of a back layer in such a manner that the resulting layer would have thickness of 0.4 μm in dry state. Thus, a sheet of a magnetic recording medium was prepared.

The sheet obtained as above was then slit into video tapes having a width of ½ inch.

The resulting video tape was subjected to 500-pass running test in a VHS type video tape recorder (NV8200, produced by Matsushita Electric Co., Ltd.). Then, the number of times of occurrence of drop-out at the last pass of the 500-pass running (namely drop-out times) was measured in the following manner. Using a drop-out counter (VH01BZ, produced by Shibasoku Co., Ltd.), the number of times of occurrence of drop-out which showed reproduction output lowered by 18 dB or more for not shorter than 15 μsec., was counted per minute. Further, the surface of the magnetic recording layer of the video tape was observed on occurrence of scratches after the 500-pass running test by means of a microscope. The results are set forth in Table 1.

EXAMPLE 2

The procedure of Example 1 was repeated except that α-alumina contained in the back layer was replaced with chromium(III) oxide $Cr_2O_3$ (mean particle diameter: 0.15 μm, maximum particle diameter: 0.3 μm) in the same amount as that of α-alumina, to prepare a video tape.

The obtained video tape was subjected to the 500-pass running test, and examined on the occurrence of drop-out and scratches on the surface of the magnetic recording layer in the same manner as described in Example 1. The results are set forth in Table 1.

EXAMPLE 3

The procedure of Example 1 was repeated except that α-alumina contained in the back layer was replaced with a mixture of α-alumina (mean particle diameter: 0.15 μm, maximum particle diameter: 0.3 μm) and chromium(III) oxide (mean particle diameter: 0.15 μm, maximum particle diameter: 0.3 μm), to prepare a video tape.

The obtained video tape was subjected to the 500-pass running test, and examined on the occurrence of drop-out and scratches on the surface of the magnetic recording layer in the same manner as described in Example 1. The results are set forth in Table 1.

COMPARISON EXAMPLE 1

The procedure of Example 1 was repeated except that α-alumina contained in the back layer ws replaced with other α-alumina having different particle size distribution (mean particle diameter: 0.5 μm, maximum particle diameter: 1.0 μm) in the same amount, to prepare a video tape.

The obtained video tape was subjected to the 500-pass running test, and examined on the occurrence of drop-out and scratches on the surface of the magnetic recording layer in the same manner as described in Example 1. The results are set forth in Table 1.

COMPARISON EXAMPLE 2

The procedure of Example 1 was repeated except that α-alumina contained in the back layer was replaced with other α-alumina having different particle size distribution (mean particle diameter: 0.15 μm, maximum particle diameter: 0.6 μm) in the same amount, to prepare a video tape.

The obtained video tape was subjected to the 500-pass running test, and examined on the occurrence of drop-out and scratches on the surface of the magnetic recording layer in the same manner as described in Example 1. The results are set forth in Table 1.

TABLE 1

|  | Times of Drop-out (per minute) | Scratches on Magnetic Recording Layer Surface |
|---|---|---|
| Example 1 | 5 | none |
| Example 2 | 4 | none |
| Example 3 | 5 | none |
| Com. Example 1 | 40 | many scratches observed |
| Com. Example 2 | 20 | some scratches observed |

We claim:

1. In a magnetic recording medium comprising a nonmagnetic support, a magnetic recording layer provided on one surface of said support and a back layer containing carbon black and a binder provided on another surface of said support, the improvement wherein said back layer has thickness of not larger than 0.6 μm and contains an inorganic filler powder which has a Mohs' scale of hardness of not less than 5, a mean particle diameter of smaller than the thickness of the back layer and not smaller than 1/5 of the thickness thereof, and the maximum particle diameter of not larger than 11/10 of the thickness of the back layer.

2. The magnetic recording medium as claimed in claim 1, wherein the mean particle diameter of said inorganic filler powder is not larger than 4/5 and not smaller than ¼ of the thickness of the back layer.

3. The magnetic recording medium as claimed in claim 1, wherein the maximum particle diameter of said inorganic filler powder is not larger than the thickness of the back layer.

4. The magnetic recording medium as claimed in claim 1, wherein said inorganic filler powder has a Mohs' scale of hardness of not less than 9.

5. The magnetic recording medium as claimed in claim 1, wherein said inorganic filler powder is a powder of α-alumina or chromium(III) oxide.

6. The magnetic recording medium as claimed in claim 1, wherein said inorganic filler powder is contained in the back layer in an amount such that the ratio by weight of the total amount of the carbon black and the inorganic filler powder to the amount of the binder is in the range of 1/0.5 to 1/3.5.

7. The magnetic recording medium as claimed in claim 1, wherein said inorganic filler powder is present in the back layer in an amount such that the ratio by weight of the carbon black to the inorganic filler powder is in the range of 1/0.3 to 1/0.03.

8. The magnetic recording medium as claimed in claim 6, wherein said inorganic filler powder is present in the back layer in an amount such that the ratio by weight of the carbon black to the inorganic filler powder is in the range of 1/0.3 to 1/0.03.

* * * * *